United States
Mellert

[11] 3,885,863
[45] May 27, 1975

[54] PRISM ARRANGEMENT
[75] Inventor: Arnold Mellert, Eltville, Germany
[73] Assignee: B & W. Filterfabrik Johannes Weber KG, Wiesbaden, Germany
[22] Filed: Jan. 29, 1973
[21] Appl. No.: 327,585

[30] Foreign Application Priority Data
June 28, 1972 Germany............................ 2410000

[52] U.S. Cl. .............. 350/196; 350/159; 350/286; 350/311
[51] Int. Cl. .............................................. G02b 3/00
[58] Field of Search ........... 350/195, 196, 285, 159, 350/286, 204, 213, 2, 311

[56] References Cited
UNITED STATES PATENTS
1,696,431  12/1928  Crockett........................... 350/213
1,921,918  8/1933   Goodwin........................... 350/213
1,970,678  8/1934   Waide............................... 350/204
2,423,321  7/1947   Hurley, Jr. ........................ 350/159
2,663,171  12/1953  Boone................................ 350/196
2,777,359  1/1957   Debrie............................... 350/196
3,100,418  8/1963   Posner............................... 350/204

Primary Examiner—Ronald L. Wibert
Assistant Examiner—Conrad Clark
Attorney, Agent, or Firm—Michael S. Striker

[57] ABSTRACT

A prism for use with a photographic objective and camera has a planar base face, a parallel planar polygonal top face, and radial faces extending between the peripheral edges of the top face and the peripheral edge of the base face. A colored layer, or a layer having a plurality of differently colored portions, is fixed to the base face of the prism and covered by a transparent glass plate. A polarizing foil may be mounted between the layer and the cover plate.

6 Claims, 2 Drawing Figures

PATENTED MAY 27 1975 3,885,863

PRISM ARRANGEMENT

BACKGROUND OF THE INVENTION

Prisms having a polygonal central top face and radial slanted lateral faces connecting the edges of the polygonal top face with the peripheral edge of the planar base face of the prism, are known. For example, if the central top face has five corners, five radial faces each of which has four sides, are provided. The edge of each radial face which is connected with the peripheral edge of the base face, is correspondingly curved. The base face and the top face are planar and parallel.

If photographic exposures are to be made with the prism of this construction for the purpose of purposely obtaining color alterations, suitable color filters have to be used. In some cases, this is not possible since the filters cause reduction of the optical quality, and furthermore, due to the fact that many mountings for photographic objectives do not permit simultaneous use of several attachments.

SUMMARY OF THE INVENTION

It is the object of the present invention to provide a prism arrangement which does not require additional filters for alteration of the colors.

With this object in view, the invention provides a prism for photographic objectives and cameras having a planar face on one side, provided with a layer of a colored material, the layer being covered by a transparent plate, preferably consisting of glass.

Prisms can be made with differently colored layers, and in accordance with the desired effect, a prism with a specific color can be attached to the camera. The colored layer may be a colored foil cemented to the prism face. However, it is also possible to obtain the colored layer by applying a coating of a liquid or plastic hardenable material to the planar face of the prism. The coating may consist of a synthetic plastic material which in hardened condition forms the layer.

The colored layer can be made of sector-shaped portions of different colors which are concentrically arranged about a common apex located in the axis of the prism. It is then possible to make photographic exposures with desired colors which are different from the actual natural colors.

In a modified embodiment, a layer or coat of a polarizing material, for example a polarization foil, is placed between the colored layer and the glass cover plate, which permits trick photographs with different color outlines.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
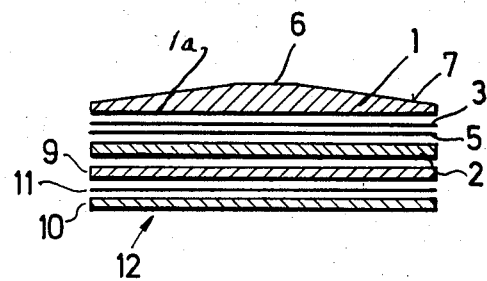
FIG. 1 is a vertical exploded sectional view illustrating a prism according to the invention.
Figure 2:
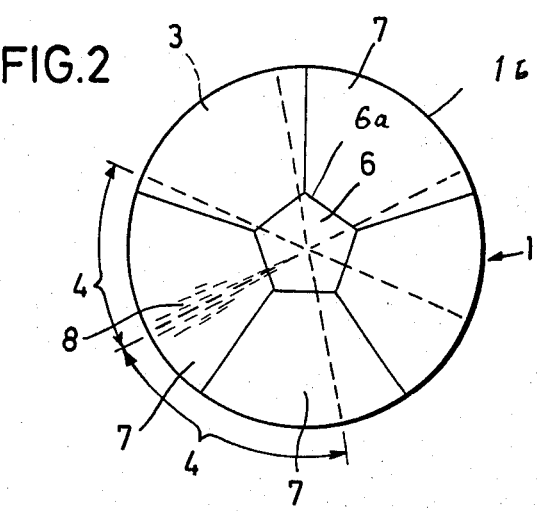
FIG. 2 is a plan view of the prism.

The drawing shows a prism disc 1 having a five cornered central planar top face 6 and a parallel base face 1a, faces 6 and 1a being parallel and planar. Five radial faces 7 connect the edges 6a of the top face 6 with the circular edge 1b of the circular base face 1a. Faces 7 are four cornered, and have straight top edges along the edges 6a, and part-circular edges coinciding with the peripheral edge 1b of the base face 1a. Faces 7 are slanted to the axis of the prism 1.

A colored layer 3 is provided on the planar base face 1a of prism 1, and is covered by a transparent glass plate 2 which is superimposed on the colored layer 3. In the arrangement shown in FIG. 1, a layer 5 consisting of a polarizing material is placed between the colored layer 3 and the cover glass plate 2.

The colored layer 3 is preferably divided into sector-shaped portions 4 which have coinciding apexes located in the axis of the prism 1. If the sector-shaped portions 4 are formed by hardenable or hardening liquid material applied in the form of a coating, it is possible to make overlapping sector-shaped portions 4, as schematically shown at 8, so that a color mixed of the colors of two adjacent sector-shaped portions 4 is obtained.

If a polarizing foil 5 is used, a polarization filter device 12 is provided, which includes two glass plates 9 and 10 between which a polarizing filter 11 is placed. The glass plate 9 is arranged under the cover glass plate 2.

The parts shown in FIG. 1 are set in a corresponding metal mounting provided with a thread or the like by which the prism according to the invention can be mounted on a corresponding thread or the like on the photographic objective. Since the mounting is entirely conventional, it is not shown in the drawing.

It will be understood that each of the elements described above, or two or more together, may also find a useful application in other types of prism arrangements differ from the type described above.

While the invention has been illustrated and described as embodied in a color alteration prism arrangement with a colored layer covering the base face of a prism disc, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Prism arrangement for use with a photographic camera, comprising a transparent prism having a planar base face, a circular edge face and an outer face composed of a planar central polygonal top face and a plurality of slanted faces extending between said planar central polygonal top face and said circular edge face of said prism; a planar transparent colored layer superimposed on said planar base face of said transparent prism and composed of a plurality of sector shaped portions having different colors and apexes meeting in the center of said prism, at least some of said differently colored sector shaped portions overlapping two adjacent ones of said slanted faces of said transparent prism; and a planar transparent plate of uniform thickness covering said planar transparent colored layer.

2. Prism arrangement as claimed in claim 1, wherein said planar base face and said layer are circular and have the same diameter.

3. Prism arrangement as claimed in claim 1, further comprising a layer of polarizing material located between said colored layer and said transparent plate.

4. Prism arrangement as claimed in claim 3, further comprising a polarization filter device attached to said transparent plate and including two glass plates, and a polarization foil secured between said glass plates.

5. Prism arrangement as claimed in claim 1, wherein said colored layer is a colored foil cemented to said planar base face.

6. Prism arrangement as claimed in claim 1, wherein said colored layer is a hardened coating on said base face.

* * * * *